United States Patent
Chen

(10) Patent No.: US 7,384,611 B2
(45) Date of Patent: Jun. 10, 2008

(54) CONFIGURATIONS AND METHODS FOR EFFLUENT GAS TREATMENT

(75) Inventor: Jen Kai Chen, Houston, TX (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 561 days.

(21) Appl. No.: 10/492,750

(22) PCT Filed: Aug. 14, 2002

(86) PCT No.: PCT/US02/25998

§ 371 (c)(1),
(2), (4) Date: Nov. 10, 2004

(87) PCT Pub. No.: WO03/045544

PCT Pub. Date: Jun. 5, 2003

(65) Prior Publication Data

US 2005/0063888 A1    Mar. 24, 2005

Related U.S. Application Data

(60) Provisional application No. 60/333,938, filed on Nov. 28, 2001.

(51) Int. Cl.
*B01D 50/00* (2006.01)
*B01D 53/56* (2006.01)

(52) U.S. Cl. .............. 422/170; 422/168; 422/171; 422/177; 423/220; 423/228; 423/244.09

(58) Field of Classification Search ............... 422/168, 422/170, 171, 177; 423/220, 228
See application file for complete search history.

(56) References Cited

U.S. PATENT DOCUMENTS

| | | | | |
|---|---|---|---|---|
| 3,752,877 A | * | 8/1973 | Beavon | 423/244.1 |
| 4,085,199 A | * | 4/1978 | Singleton et al. | 423/574.1 |
| 4,332,672 A | * | 6/1982 | Blanton et al. | 208/120.01 |
| 5,716,587 A | * | 2/1998 | Khanmamedov | 422/168 |

* cited by examiner

*Primary Examiner*—Walter D. Griffin
*Assistant Examiner*—Lessanework T Seifu
(74) *Attorney, Agent, or Firm*—Fish & Associates, PC

(57) ABSTRACT

Methods and configurations are drawn to a plant in which an effluent gas with a sulfur dioxide content of more than 1.5% is mixed with a substantially sulfur dioxide free offgas from a contactor to form a mixed feed gas for a hydrogenation reactor, wherein the mixed feed gas has a sulfur dioxide content of less than 1.5%.

21 Claims, 2 Drawing Sheets

US 7,384,611 B2

CONFIGURATIONS AND METHODS FOR EFFLUENT GAS TREATMENT

This application claims the benefit of U.S. provisional application No. 60/333,938, filed Nov. 28, 2001, which is incorporated herein by reference.

FIELD OF THE INVENTION

The field of the invention is treatment of effluent gases from sulfur removal processes, and especially effluent gases from an S Zorb process (Sulfur removal technology by Phillips Petroleum).

BACKGROUND OF THE INVENTION

Sulfur removal from effluent gases has become increasingly important as regulations require refineries and other petrochemical facilities to reduce their output of sulfurous compounds below previously tolerated concentrations. There are various processes known in the art to recover sulfur from numerous process gases.

For example, in a typical Claus sulfur recovery plant configuration, hydrogen sulfide is catalytically oxidized to elemental sulfur by reacting hydrogen sulfide with sulfur dioxide, which is typically generated in the same process by combustion of hydrogen sulfide with air in a reactor furnace. Because the Claus reaction represents an equilibrium chemical reaction, it is not possible for a Claus plant to convert all the incoming sulfur compounds to elemental sulfur. To increase at least to some extent the sulfur recovery, two or more stages may be coupled in series. However, depending on the configuration and initial concentration of sulfur compounds, multiple stages may not sufficiently limit output of hydrogen sulfide and/or sulfur dioxide in such plants.

Consequently, additional tail gas treatment units may be used to further reduce the output of hydrogen sulfide and/or sulfur dioxide. For example, some process configurations include heating and reducing all sulfur compounds to hydrogen sulfide, cooling and quenching, and hydrogen sulfide absorption, stripping and recycle as depicted in prior art FIG. 1. Here, sulfur components in the Claus tail gas are reduced to hydrogen sulfide in a hydrogenation reactor. The so formed hydrogen sulfide is then removed in an amine or other removal unit. While such processes are relatively simple and effectively remove sulfur from the feed gas to a significant extent, they are typically limited to sulfur dioxide concentrations of less than 1 percent in the feed gas (here: the Claus tail gas). At sulfur dioxide concentrations higher than about 1.5 percent, the temperature across the hydrogenation reactor will rise to unacceptable levels and likely damage or even completely destroy the catalyst bed. Moreover, the feed gas for such processes typically needs to be substantially free of oxygen for proper operation of the hydrogenation reactor.

Alternatively, sulfur can be removed in a process, in which sulfur and its compounds entrained in the tail gas of a Claus plant are converted to hydrogen sulfide through simultaneous hydrogenation and hydrolysis (DelaMora, et al. 1985). The so generated hydrogen sulfide is then converted to elemental sulfur in a Stretford process using an alkaline solution of salts on vanadium oxide ($V_2O_5$) and anthraquinone disulfonate to absorb and oxidize hydrogen sulfide to sulfur. The hydrogenation step is substantially the same as in the process described above; therefore, it is subjected to the same limitations. Hence, despite a relatively high rate of sulfur removal, the feed gas is generally limited to sulfur dioxide concentrations of less than 1 percent in the feed gas (here: the Claus tail gas).

Although various configurations and methods are known to reduce sulfur concentrations in effluent streams, all or almost all of them suffer from one or more disadvantages. Among other things, known processes are frequently limited to an essentially oxygen free feed gas and a sulfur dioxide concentrations of less than 1 percent in the feed gas. Therefore, there is still a need to provide improved methods and configuration to reduce the sulfur content in effluent gases.

SUMMARY OF THE INVENTION

The present invention is directed to a plant that includes a process unit producing an effluent gas comprising sulfur dioxide, a hydrogenation reactor that is fluidly coupled to the process unit and that receives a mixed feed gas comprising at least a portion of the effluent gas, and that produces a hydrotreated feed gas comprising hydrogen sulfide. A contactor is fluidly coupled to the hydrogenation reactor and employs a solvent that removes the hydrogen sulfide, thereby producing a hydrogen sulfide depleted offgas, and a recycle loop is fluidly coupled to the contactor and the hydrogenation reactor, wherein at least a portion of the hydrogen sulfide depleted offgas from the contactor is combined with the effluent gas to form a mixed feed gas with a sulfur dioxide concentration no more than 2.5%.

In one aspect of the inventive subject matter, the process unit comprises a catalyst regenerator in an S Zorb process and the effluent gas is a catalyst regenerator effluent gas with sulfur dioxide at a concentration of between about 0% to 5%. It is further preferred that the sulfur dioxide concentration in the mixed feed gas is no more than 1.7%, and even more preferably no more than 1.5%. Particularly contemplated hydrogenation reactors comprise a cobalt molybdenum catalyst, and especially contemplated solvents comprise an amine-containing solvent.

In another aspect of the inventive subject matter, contemplated plants further include a reducing gas generator that receives at least a portion of the effluent gas, wherein the reducing gas generator is configured and operated under a condition that substantially depletes the effluent gas from oxygen. It is also preferred that between about 20% to about 40% of the hydrogen sulfide depleted offgas from the contactor is combined with the effluent gas to form the mixed feed gas to the hydrogenation reactor.

Various objects, features, aspects and advantages of the present invention will become more apparent from the following detailed description of preferred embodiments of the invention, along with the accompanying drawings in which like numerals represent like components.

DETAILED DESCRIPTION

The inventor has discovered that effluent gases with a relatively high concentrations of sulfur dioxide (i.e., above 1.5%) can be treated in a process including a hydrogenation reactor by mixing the effluent gas with another gas that is substantially free (i.e., less than 0.1%) of sulfur containing compounds to effectively reduce the concentration of sulfur dioxide in the effluent gas to a level that allows hydrotreating without excessive heat development in the hydrogenation reactor.

Figure 1:
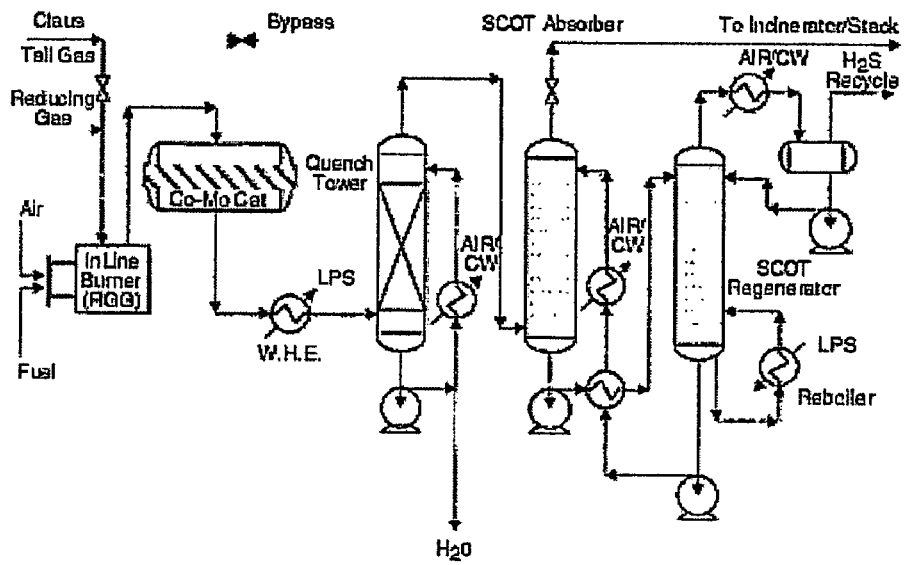
FIG. 1 is a schematic view of a prior art configuration for tail gas treatment.
Figure 3:
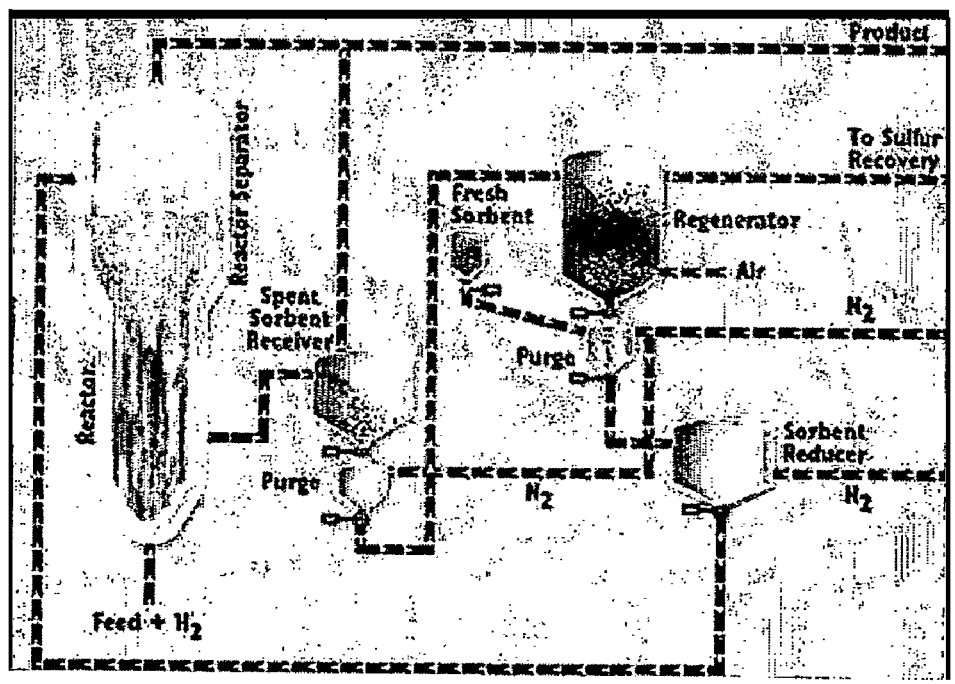
FIG. 3 is a schematic view of a prior art configuration for an S Zorb process.
Figure 2:
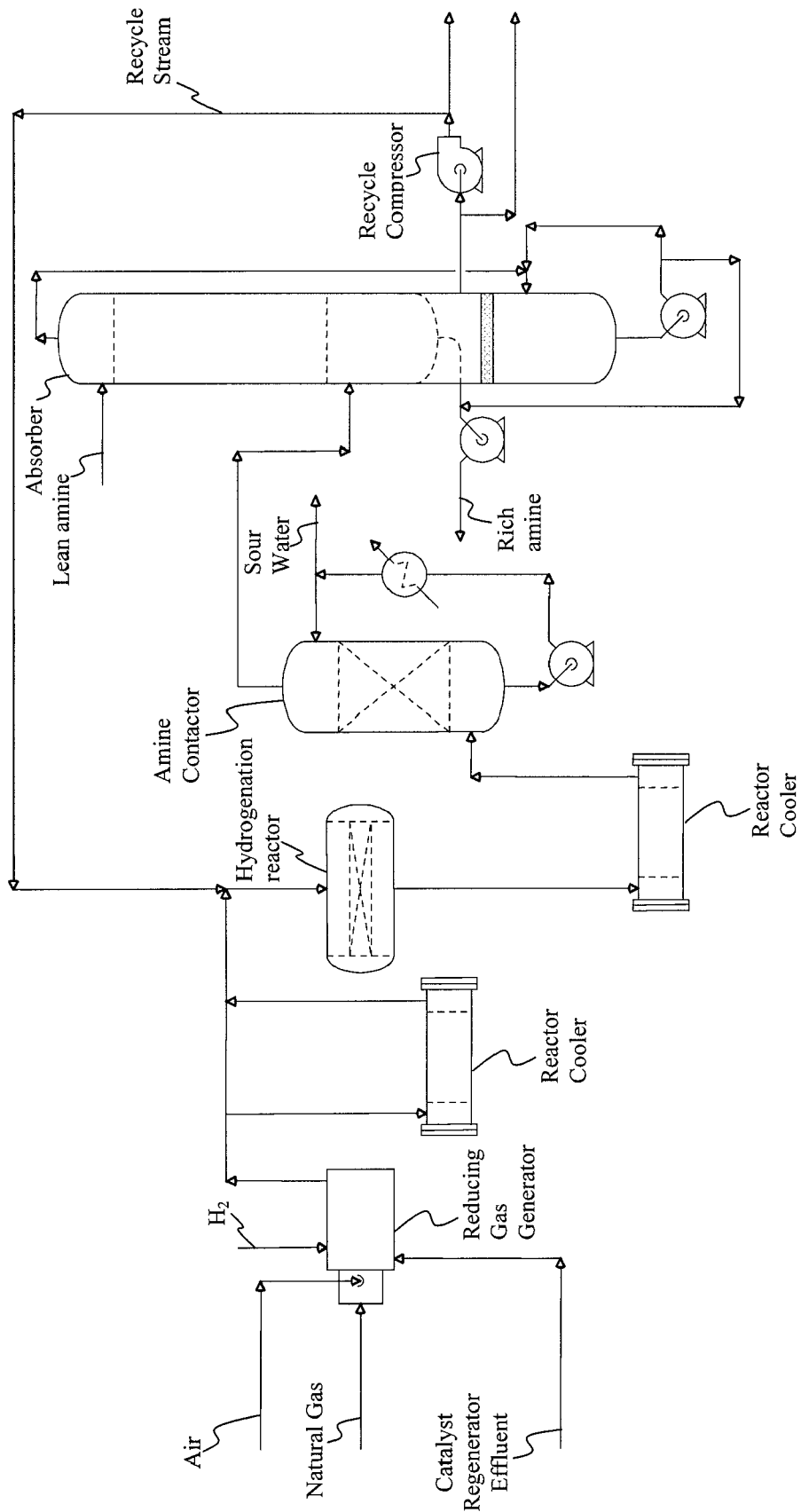
FIG. 2 is a schematic view one exemplary configuration according to the inventive subject matter.

In a particularly preferred aspect, the inventors contemplate a configuration as depicted in FIG. 2 in which the effluent gas is a regen gas from a S Zorb process (here: the effluent gas from the catalyst regenerator; see prior art FIG. 3) having a typical sulfur dioxide content of about zero to 3% and an oxygen content of about zero to 4%. The oxygen content is preferably reduced by introducing the effluent gas into a reducing gas generator that is operated using natural gas and air, and by feeding hydrogen, if needed to supply sufficient reducing gas to the effluent gas. Typical operation conditions are selected such that the oxygen is substantially completely removed from the effluent gas. Thus, a typical operation temperature will be between about 1000° and 1500° F., and more preferably about 1200° F. Alternatively, it is contemplated that the oxygen concentration may also be reduced by methods other than a reducing gas generator, and especially contemplated include catalytic conversion or destruction of oxygen. The resulting substantially oxygen free and heated effluent gas is then cooled and mixed with a recycle stream to form a hydrogenation reactor feed stream, which is introduced into a hydrogenation reactor. A further reactor cooler cools the hydrogenation reactor effluent stream, and the hydrogen sulfide formed in the hydrogenator reactor is subsequently absorbed in an amine contactor. The amine solvent is recycled, and the now substantially hydrogen sulfide free (i.e., less than 0.1%) effluent gas is split into a first gas steam and second gas stream, wherein the first gas stream leaves the plant and wherein the second gas stream is used as the recycle stream (supra) to reduce the effective concentration of sulfur dioxide in the hydrogenation reactor feed gas.

It should be especially appreciated that in alternative aspects of the inventive subject matter the effluent gas need not be limited to a regen gas from a S Zorb process (Phillips Petroleum), and it is contemplated that all gas streams containing sulfur dioxide concentrations higher than 1.5% are suitable. For example, alternative gas streams may include 2.5% or 3.7%, and even more sulfur dioxide. Thus, where contemplated effluent gases are sufficiently low in oxygen, it is contemplated that appropriate configurations need not necessarily comprise a reducing gas generator.

With respect to the hydrogenation reactor, it is contemplated that all known hydrogenation reactors may be employed for use in conjunction with the teachings presented herein, and that suitable hydrogenation reactors may or may not include various catalysts. However, particularly preferred hydrogenation reactors include a cobalt molybdenum catalyst. Furthermore, it should be appreciated that the removal of the hydrogen sulfide formed in the hydrogenation reactor need not be limited to an amine-solvent based contactor/stripper, and it should be recognized that all hydrogen sulfide removal devices are suitable, so long as such devices produce a substantially hydrogen sulfide free (i.e., less than 0.1%) off gas stream that can be employed as a recycle gas stream to reduce the effective concentration of sulfur dioxide in the hydrogenation reactor feed gas.

While it is generally preferred that the recycle gas stream is drawn from the substantially hydrogen sulfide free contactor offgas in an amount of about 20-40%, it should be recognized that the exact amount will typically depend on the concentration of sulfur dioxide in the effluent gas. Consequently, amounts higher than 40% are contemplated as well as less than 20%. Moreover, it should be appreciated that at least a portion of the recycle gas may also be derived from alternative sources within the plant, so long as such sources provide a gas that is substantially oxygen and sulfur dioxide free. In a still further aspect of the inventive subject matter, it is contemplated that the mixing of the sulfur dioxide rich effluent with the recycle gas stream may be performed at various points, so long as the mixed stream will be formed upstream of, or at the hydrogenation reactor. For example, at least a portion of the recycle gas stream may be directed into the hydrogenation reactor.

In still further alternative aspects it is contemplated that the effluent gas of a S Zorb process may comprise $SO_2$ concentrations of about 1.5% or even less, especially where the regeneration process for the catalyst is run in a continuous fashion. In such configurations (and other configurations where the effluent gas has an $SO_2$ concentration of less than 1.5%), it is contemplated that the effluent gas will still comprise oxygen to at least some degree, which may be detrimental to the catalyst bed in the hydrogenation reactor. Consequently, it should be appreciated that in alternative S Zorb regeneration configurations the effluent gas need not necessarily be mixed with a recycle gas to reduce the $SO_2$ concentration, but that the effluent gas will be fed into a reducing gas generator that receives at least a portion of the effluent gas, wherein the reducing gas generator is configured and operated under a condition that substantially depletes the effluent gas from oxygen. Thus, where the effluent gas comprises relatively low concentrations of $SO_2$ (i.e., below 1.5%), it is contemplated that the effluent gas is processed in a reducing gas generator to (at least partially) remove oxygen from the effluent gas.

It should further be appreciated that by using a hydrogenation reactor to remove sulfur dioxide from the effluent gas, and especially from the S Zorb regen gas, in a typical industrial application, the carbon monoxide concentration of the effluent gas is concomitantly reduced by reaction of the carbon monoxide and water to form carbon dioxide and hydrogen.

Thus, it is contemplated that a plant may comprise a process unit producing an effluent gas comprising sulfur dioxide, and a hydrogenation reactor fluidly coupled to the process unit, receiving a mixed feed gas comprising at least a portion of the effluent gas, and producing a hydrotreated feed gas comprising hydrogen sulfide. Contemplated plants may further comprise a contactor fluidly coupled to the hydrogenation reactor and use a solvent that removes hydrogen sulfide, thereby producing a hydrogen sulfide depleted offgas, and still further comprise a recycle loop fluidly coupled to the contactor and the hydrogenation reactor, wherein at least a portion of the hydrogen sulfide depleted offgas from the contactor is combined with the effluent gas to form a mixed feed gas with a sulfur dioxide concentration of no more than 2.5%, more preferably no more than 1.7%, and most preferably no more than 1.5%. While not limiting to the inventive subject matter, it is contemplated that the sulfur dioxide concentration in the effluent gas is less than 5%, and more typically less than 3%. Preferred configurations may further comprise reducing gas generator that receives at least a portion of the effluent gas, wherein the reducing gas generator is configured and operated under a condition that substantially depletes the effluent gas from oxygen, and it is especially contemplated that between about 20% to about 40% of the hydrogen sulfide depleted offgas from the contactor is combined with the effluent gas to form the mixed feed gas to the hydrogenation reactor.

Thus, specific embodiments and applications for configurations and methods for improved effluent gas treatment have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
a catalyst regenerator configured to produce an $O_2$-containing catalyst regenerator effluent waste gas comprising sulfur dioxide at a concentration of at least 1.5%;
a reducing gas generator that is configured to receive at least a portion of the effluent waste gas and to form oxygen-depleted effluent gas;
a hydrogenation reactor fluidly coupled to the catalyst regenerator, receiving a mixed feed gas comprising at least a portion of the oxygen-depleted effluent waste gas, and producing a hydrotreated feed gas comprising hydrogen sulfide;
a contactor fluidly coupled to the hydrogenation reactor and using a solvent that removes the hydrogen sulfide, thereby producing a hydrogen sulfide depleted offgas;
a recycle loop fluidly coupling the contactor to the hydrogenation reactor such that the recycle loop provides at least a portion of the hydrogen sulfide depleted offgas; from the contactor to the effluent waste gas, to thereby form the mixed feed gas, wherein the mixed feed gas has a sulfur dioxide concentration of more than 0% and no more than 2.5%; and
wherein the plant is further configured to allow another portion of the hydrogen sulfide depleted offgas to leave the plant.

2. The plant of claim 1 wherein the catalyst regenerator comprises a catalyst regenerator of a sulfur removal process unit.

3. The plant of claim 1 wherein the catalyst regenerator is configured to provide the effluent waste gas comprising sulfur dioxide at a concentration of between about 1.5% to 5%.

4. The plant of claim 1 wherein the catalyst regenerator is configured to provide the effluent waste gas comprising sulfur dioxide at a concentration of between about 1.5% to 3%.

5. The plant of claim 1 wherein the recycle loop is configured to allow reduction of the sulfur dioxide concentration in the mixed feed gas to no more than 1.7%.

6. The plant of claim 1 wherein the recycle loop is configured to allow reduction of the sulfur dioxide concentration in the mixed feed gas to no more than 1.5%.

7. The plant of claim 1 wherein the hydrogenation reactor comprises a cobalt molybdenum catalyst.

8. The plant of claim 1 wherein the recycle loop is configured to allow feeding of between about 20% to about 40% of the hydrogen sulfide depleted offgas from the contactor to the effluent gas to thereby form the mixed feed gas to the hydrogenation reactor.

9. A method of treating an $O_2$-containing catalyst regenerator effluent waste gas comprising:
providing a catalyst regenerator producing an $O_2$-containing catalyst regenerator effluent waste gas that has a sulfur dioxide concentration of at least 1.5%;
fluidly coupling a hydrogenation reactor to the catalyst regenerator, and providing a mixed feed gas comprising at least a portion of the effluent waste gas to the hydrogenation reactor, thereby producing a hydrotreated effluent gas comprising hydrogen sulfide;
fluidly coupling a contactor to the hydrogenation reactor and using a solvent that removes the hydrogen sulfide, thereby producing a hydrogen sulfide depleted offgas;
combining at least a portion of the hydrogen sulfide depleted offgas from the contactor with the effluent gas from the catalyst regenerator, to thereby form the mixed feed gas having a sulfur dioxide concentration of more than 0% and no more than 2.5%; and
allowing another portion of the hydrogen sulfide depleted offgas to leave the plant.

10. The method of claim 9 wherein the catalyst regenerator comprises a catalyst regenerator in a S Zorb process.

11. The method of claim 9 wherein the sulfur dioxide concentration in the effluent gas is between about 1.5% and 3%.

12. The method of claim 9 wherein the sulfur dioxide concentration in the effluent gas is between about 1.5% and 5%.

13. The method of claim 9 wherein the sulfur dioxide concentration in the mixed feed gas is more than 0% and no more than 1.7%.

14. The method of claim 9 wherein the sulfur dioxide concentration in the mixed feed gas is more than 0% and no more than 1.5%.

15. The method of claim 9 wherein the hydrogenation reactor comprises a cobalt molybdenum catalyst.

16. The method of claim 9 wherein the solvent comprises an amine-containing solvent.

17. The method of claim 9 further comprising providing a reducing gas generator that receives at least a portion of the effluent gas, wherein the reducing gas generator is configured and operated under a condition that substantially depletes the effluent gas from oxygen.

18. The method of claim 9 wherein between about 20% to about 40% of the hydrogen sulfide depleted offgas from the contactor is combined with the effluent gas to form the mixed feed gas to the hydrogenation reactor.

19. A plant comprising:
a catalyst regenerator configured to produce a catalyst regenerator effluent waste gas comprising sulfur dioxide at a concentration of at least 1.5% and $O_2$;
a reducing gas generator that is configured to receive at least a portion of the effluent waste gas, wherein the reducing gas generator is configured and operated under a condition that substantially depletes the effluent gas from $O_2$;
a hydrogenation reactor fluidly coupled to the catalyst regenerator and configured to receive a mixed gas comprising (1) a hydrogen sulfide depleted gas and (2) the substantially oxygen depleted effluent waste gas, and wherein the hydrogenation reactor is further configured to produce a hydrotreated substantially $O_2$ depleted effluent gas comprising hydrogen sulfide;

a contactor fluidly coupled to the hydrogenation reactor and configured to use a solvent that is capable of removing at least part of the hydrogen sulfide from the hydrotreated substantially oxygen depleted effluent gas, thereby forming the hydrogen sulfide depleted gas; and wherein the plant is further configured to allow another portion of the hydrogen sulfide depleted gas to leave the plant.

20. The plant of claim 19 wherein the catalyst regenerator comprises a catalyst regenerator of a sulfur removal process unit.

21. The plant of claim 19 wherein the catalyst regenerator is configured to provide an effluent gas comprising sulfur dioxide at a concentration of between about greater than 0% to about 5%.

* * * * *